United States Patent
Han

(10) Patent No.: US 12,469,572 B2
(45) Date of Patent: Nov. 11, 2025

(54) MEMORY DEVICE, MEMORY SYSTEM, AND METHOD OF OPERATING THE SAME

(71) Applicant: YANGTZE MEMORY TECHNOLOGIES CO., LTD., Wuhan (CN)

(72) Inventor: Jinchi Han, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 105 days.

(21) Appl. No.: 18/387,784

(22) Filed: Nov. 7, 2023

(65) Prior Publication Data

US 2025/0140327 A1    May 1, 2025

(30) Foreign Application Priority Data

Oct. 31, 2023  (CN) .......................... 202311440894.1

(51) Int. Cl.
| | | |
|---|---|---|
| *G11C 7/00* | (2006.01) | |
| *G11C 16/08* | (2006.01) | |
| *G11C 16/10* | (2006.01) | |
| *G11C 16/26* | (2006.01) | |
| *G11C 16/34* | (2006.01) | |

(52) U.S. Cl.
CPC .......... *G11C 16/3459* (2013.01); *G11C 16/08* (2013.01); *G11C 16/102* (2013.01); *G11C 16/26* (2013.01)

(58) Field of Classification Search
CPC ....... G11C 7/1051; G11C 7/1078; G11C 7/22; G11C 7/106; G11C 7/1057
USPC ..................................................... 365/189.05
See application file for complete search history.

(56) References Cited

U.S. PATENT DOCUMENTS

| | | | |
|---|---|---|---|
| 9,543,026 B2 * | 1/2017 | Song | G11C 16/3459 |
| 2016/0093388 A1 | 3/2016 | Song et al. | |
| 2022/0068375 A1 | 3/2022 | Guo | |
| 2023/0402071 A1* | 12/2023 | Park | G11C 11/5671 |

FOREIGN PATENT DOCUMENTS

| | | |
|---|---|---|
| CN | 107230499 A | 10/2017 |
| CN | 115331720 A | 11/2022 |
| CN | 115497526 A | 12/2022 |
| CN | 116013377 A | 4/2023 |
| JP | 2022009279 A | 1/2022 |

\* cited by examiner

*Primary Examiner* — Son T Dinh
(74) *Attorney, Agent, or Firm* — BAYES PLLC

(57) ABSTRACT

A memory device, memory system, and a method of operating the same are provided. The method for operating the memory device, includes storing first page data in a cache latch, storing the first page data in a first data latch and storing last page data in a second data latch, programming memory cells of a first page of a memory array with the first page data, storing the first page data in the second data latch and storing second page data in the first data latch, and programming memory cells of a second page with a second page data.

20 Claims, 11 Drawing Sheets

| | | | SLC with VFC | | | |
|---|---|---|---|---|---|---|
| | DC | D2 | D1 | DL | | DS |
| program prologue | program begin | | | | | |
| | DC = user data<br>0: program cell<br>1: erase cell | | | | | |
| | last program data backup (all plane) | | | | | |
| | | D2=D1<br>0: program cell<br>1: erase cell | | | | |
| | data transfer (selected plane) | | D1=DC<br>0: program cell<br>1: erase cell | | | |
| | cache data in<br>DC =next user data<br>0: program cell<br>1: erase cell | | | | | |
| | 1st program inhibit | | | | | |
| 1st pulse | program pulse | | | | | DS=D1<br>0: program cell<br>1: erase cell |
| 1st verify | verify preset | | | | | |
| | verify sensing | | | | | DS=~DS<br>0: erase cell + pass cell<br>1: verify cell |
| | vfc setup after verify | | | | DL=DS<br>0: pass cell + erase cell<br>1: erase cell | DS=~DS&~S0<br>0: erase cell + pass cell<br>1: fail cell |
| | verify recovery<br>program inhibit | | | | | DS=~DS<br>0: program cell<br>1: erase cell + pass cell |

FIG. 4A

MEMORY DEVICE, MEMORY SYSTEM, AND METHOD OF OPERATING THE SAME

CROSS-REFERENCE TO RELATED APPLICATIONS

This application claims the benefit of priority to Chinese Application No. 202311440894.1, filed on Oct. 31, 2023, which is incorporated herein by reference in its entirety.

BACKGROUND

The present disclosure relates to a memory device, a memory system, and a method of operating the same.

In a non-volatile memory device, programming data into memory cell array of the memory device takes time, only one page data can be programmed into the memory cell array in each program. As such, when multiple data pages are written into the memory cell array continuously, it is necessary to wait for the end of the programming of the current data page, and then transfer and program the next data page into the memory cell array. Therefore, the process of writing data to the memory cell array is inefficient and cannot provide continuous programming.

SUMMARY

In one aspect, a method for operating a memory device, includes storing first page data in a cache latch, storing the first page data in a first data latch and storing last page data in a second data latch, programming memory cells of a first page of a memory array with the first page data, storing the first page data in the second data latch and storing second page data in the first data latch, and programming memory cells of a second page with a second page data.

In some implementations, before programming memory cells of a first page of a memory array with the first page data, the method further includes determining whether the last page data is programmed successfully.

In some implementations, in response to determining that the last page data is programmed successfully, the method further includes storing the second page data in the cache latch.

In some implementations, in response to determining that the last page data is not programmed successfully, the method further includes reading out the last page data in the second data latch.

In some implementations, in response to determining that the last page data is not programmed successfully, the method further includes reading out the first page data in the first data latch.

In some implementations, in response to determining that the last page data is not programmed successfully, the method further includes reading out one or more page data in the memory cells of the memory array.

In some implementations, reading out the one or more page data in the memory cells of the memory array is triggered in response to a first read command. Reading out the first page data in the first data latch and the last page data in the second data latch is triggered in response to a second read command.

In some implementations, programming memory cells of a first page with the first page data includes applying a program pulse to word lines corresponding to the memory cells of the first page according to the first page data, and verifying the memory cells of the first page.

In some implementations, programming memory cells of a first page with the first page data includes configuring inhibit information of the memory cells the program pulse is applied to, and storing the inhibit information of the memory cells in a main latch.

In some implementations, verifying the memory cells of the first page includes storing a verify information of the memory cells in a main latch.

In some implementations, verifying the memory cells of the first page further includes: applying a verify voltage to word lines corresponding to the memory cells of the first page.

In some implementations, verifying the memory cells of the first page further includes storing the verify result in the main latch.

In some implementations, the method further includes determining whether the first page data is programmed successfully.

In some implementations, in response to determining the first page data is programmed successfully, the method further includes storing the first page data in the second data latch and storing the second page data in the first data latch.

In some implementations, in response to determining the first page data is programmed not successful, the method further includes determining whether a number of loops of reprogramming reaches to a loop threshold, and in response to determine that the number of loops of reprogramming reaches to the loop threshold, the method further includes storing the first page data in the second data latch and storing the second page data in the first data latch.

In some implementations, in response to determine that the number of loops of reprogramming does not reach to the loop threshold, the method further includes applying the program pulse to the word lines corresponding to the memory cells of the first page according to the first page data.

In some implementations, each memory cell in the memory device is a Single-level cell (SLC).

In another aspect, a memory device includes a memory cell array. The memory cell array includes memory cells, a peripheral circuit coupled to the memory cell array. The peripheral circuit includes: a page buffer coupled to the memory cell array. The page buffer includes: a cache latch; a first data latch; and a second data latch; and a control logic coupled to the memory cell array. The peripheral circuit is configured to: store first page data in the cache latch; store last page data in the second data latch and store the first page data in the first data latch; store second page data in the cache latch; program memory cells of a first page of the memory cell array with the first page data; store the first page data in the second data latch and store the second page data in the first data latch; and program memory cells of a second page of the memory cell array with the second page data.

In some implementations, after storing last page data in the second data latch and storing the first page data in the first data latch, the peripheral circuit is further configured to: read out the last page data in the second data latch.

In some implementations, after storing last page data in the second data latch and storing the first page data in the first data latch, the peripheral circuit is further configured to: read out the first page data in the first data latch.

In some implementations, the peripheral circuit is configured to read out the last page data in the second data latch after programming memory cells of a second page of the memory cell array with the second page data.

In some implementations, the peripheral circuit is configured to read out the last page data in the second data latch in response to programming memory cells of a first page being failed.

In some implementations, the page buffer further includes: a main latch, and the control logic is further configured to: store the last page data in the main latch.

In some implementations, the peripheral circuit is configured to: store the last page data in the main latch after storing second page data in the cache latch.

In some implementations, when programming memory cells of a first page of the memory cell array with the first page data, the peripheral circuit is further configured to: inhibit memory cells of the first page according to the last page data in the main latch.

In some implementations, the page buffer further includes: a bias latch. The peripheral circuit is further configured to: verify memory cells of the first page of the memory cell array.

In some implementations, the peripheral circuit configured to verify memory cells of the first page of the memory cell array is after programming memory cells of a first page of the memory cell array with the first page data.

In some implementations, the peripheral circuit configured to program memory cells of a first page of the memory cell array with the first page data is further configured to: instruct a word line driver to apply a first program voltage to a first word line corresponding to memory cells of the first page of the memory cell array according to the first page data.

In some implementations, each memory cell in the memory cell array is a Single-level cell (SLC).

In still another aspect, a memory device includes a memory cell array and a peripheral circuit coupled to the memory cell array. The memory cell array includes memory cells. The peripheral circuit includes a page buffer coupled to the memory cell array. The peripheral circuit is configured to: store last page data and first page data in the page buffer; program memory cells of a first page of the memory cell array with the first page data; store the first page data and the second page data in the page buffer; and program memory cells of a second page of the memory cell array with a second page data.

In yet still another aspect, a memory system, includes a memory device; and a memory controller coupled to the memory device. The memory device includes: a memory cell array includes memory cells; and a peripheral circuit coupled to the memory cell array. The peripheral circuit includes a page buffer coupled to the memory cell array. The memory controller is configured to: send an inquiry command to the memory cell array to confirm whether last page data is programmed successful; and in response to the last page data is programmed not successful, send a first read command to read out first page data and the last page data in the page buffer.

In some implementations, in response to the last page data is programmed not successfully, send a second read command to read out one or more page data in the memory cells of the memory array.

In some implementations, after sending a first read command to read out one or more page data in the memory cells of the memory array, and sending a second read command to read out first page data in the first data latch and the last page data in the second data latch, the memory controller is further configured to: redistribute new physical addresses of corresponding memory cells of the memory cell array to the last page data and the current page data of the page buffer, and the one or more page data of the memory cell array; and program the last page data, the current page data, and the one or more page data into the memory cell array with the new physical addresses.

In some implementations, after sending a first read command to read out one or more page data in the memory cells of the memory array, and sending a second read command to read out first page data and the last page data in the page buffer, the memory controller is further configured to: erase the memory cells corresponding to current physical addresses executing current program operation; and program the last page data, the current page data, and the one or more page data into the memory cell array with the current physical addresses.

In some implementations, after sending a first read command to read out one or more page data in the memory cells of the memory array, and sending a second read command to read out first page data in the first data latch and the last page data in the second data latch, wherein the memory controller is further configured to: redistribute new physical addresses of corresponding memory cells of the memory cell array to the last page data of the page buffer; and program the last page data into the memory cell array with the new physical addresses.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 4A illustrates a table including corresponding data in an example page buffer during an operation of an example memory device, according to various embodiments of the present disclosure.

Figure 1:
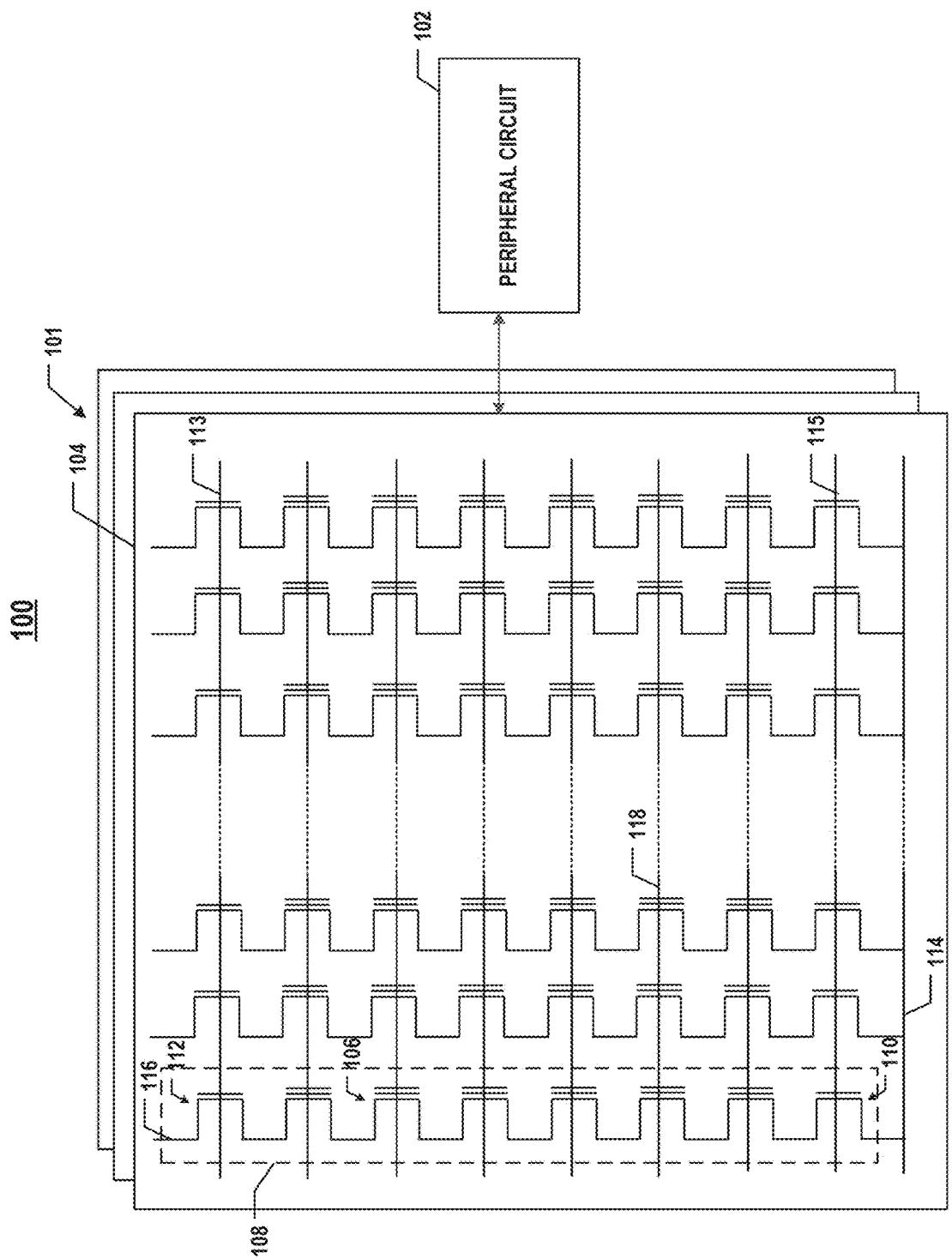
FIG. 1 illustrates a schematic circuit diagram of an example memory device including peripheral circuits, according to some implementations of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

When multiple page data are to be written into the memory cell array continuously, these page data can be temporarily stored in a page buffer (e.g., cache latch or data latch in the page buffer) and then transferred and written into the memory cell array, thereby increasing the efficiency and providing continuous programming without waiting for the end of the programming of the current data page to start the next programming process. The way storing these to-be-written page data in the cache latch or data latch of the page buffer during the programming of the current page data (i.e., during the NAND busy time, or so-called page programming time (tPROG)) and then programming these to-be-written page data into the memory cell array is called a cache program. However, during the programming process, especially in a single-level cell (SLC) architecture, the data stored in the page buffer can only be retrieved after the current programming process is completed. As such, whether a first page data is programmed successfully or not is unknown until the start of programming a second page data. Furthermore, before the completion of the second page data being programmed into the memory cell array, the first page data stored in the page buffer may be erased and replaced by the next page data cached in. Therefore, the first page data stored in the page buffer cannot be read out to determine whether the first page data is programmed successfully. Also, the destruction of the page data stored in the page buffer prevents the page data being used for data recovery in the event that one of the page data is programmed unsuccessfully.

To address one or more of the aforementioned issues, the present disclosure introduces solutions in which the processes and the usage of the latches in the page buffer are provided to retain the page data in the page buffer without being erased. Also, the present disclosure introduces solutions in which the page data stored in the page buffer can be used for data recovery in response to that one of the page data is programmed unsuccessfully.

FIG. 1 illustrates a schematic circuit diagram of a memory device 100 including peripheral circuits, according to some aspects of the present disclosure. Memory device 100 can include a memory cell array 101 and peripheral circuits 102 coupled to memory cell array 101. In some implementations, memory cell array 101 can be a NAND Flash memory cell array in which memory cells 106 are provided in the form of an array of three-dimensional (3D) NAND memory strings 108 each extending vertically above a substrate (not shown). In some implementations, each 3D NAND memory string 108 includes a plurality of memory cells 106 coupled in series and stacked vertically. Each memory cell 106 can hold a continuous, analog value, such as an electrical voltage or charge, that depends on the number of electrons trapped within a region of memory cell 106. Each memory cell 106 can be either a floating gate type of memory cell including a floating-gate transistor or a charge trap type of memory cell including a charge-trap transistor. Each array of 3D NAND memory strings 108 can include one or more 3D memory devices.

In some implementations, each memory cell 106 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 106 is a multi-level cell (MLC) that is capable of storing more than a single bit of data in four or more memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 1, each 3D NAND memory string 108 can include a source select gate (SSG) transistor 110 at its source end and a drain select gate (DSG) transistor 112 at its drain end. SSG transistor 110 and DSG transistor 112 can be configured to activate selected 3D NAND memory strings 108 (columns of the array) during read and program operations. In some implementations, the sources of SSG transistors 110 of 3D NAND memory strings 108 in the same block 104 are coupled through a same source line (SL) 114, e.g., a common SL, for example, to the ground. DSG transistor 112 of each 3D NAND memory string 108 is coupled to a respective bit line 116 from which data can be read or programmed via an output bus (not shown), according to some implementations. In some implementations, each 3D NAND memory string 108 is configured to be selected or unselected by applying a select signal (e.g., a select voltage above the threshold voltage of DSG transistor 112) or a deselect signal (e.g., a deselect voltage such as 0

V) to respective DSG transistor 112 through one or more DSG lines 113 and/or by applying a select voltage (e.g., above the threshold voltage of SSG transistor 110) or a deselect voltage (e.g., 0 V) to respective SSG transistor 110 through one or more SSG lines 115.

As shown in FIG. 1, 3D NAND memory strings 108 can be organized into multiple blocks 104, each of which can have a common source line 114. In some implementations, each block 104 is the basic data unit for erase operations, i.e., all memory cells 106 on the same block 104 are erased at the same time. Memory cells 106 can be coupled through word lines 118 that select which row of memory cells 106 is affected by read and program operations. In some implementations, each word line 118 is coupled to a row of memory cells 106, which is the basic data unit for program and read operations. Each word line 118 can be coupled to a plurality of control gates (gate electrodes) at each memory cell 106 in respective row and a gate line coupling the control gates.

Figure 2:
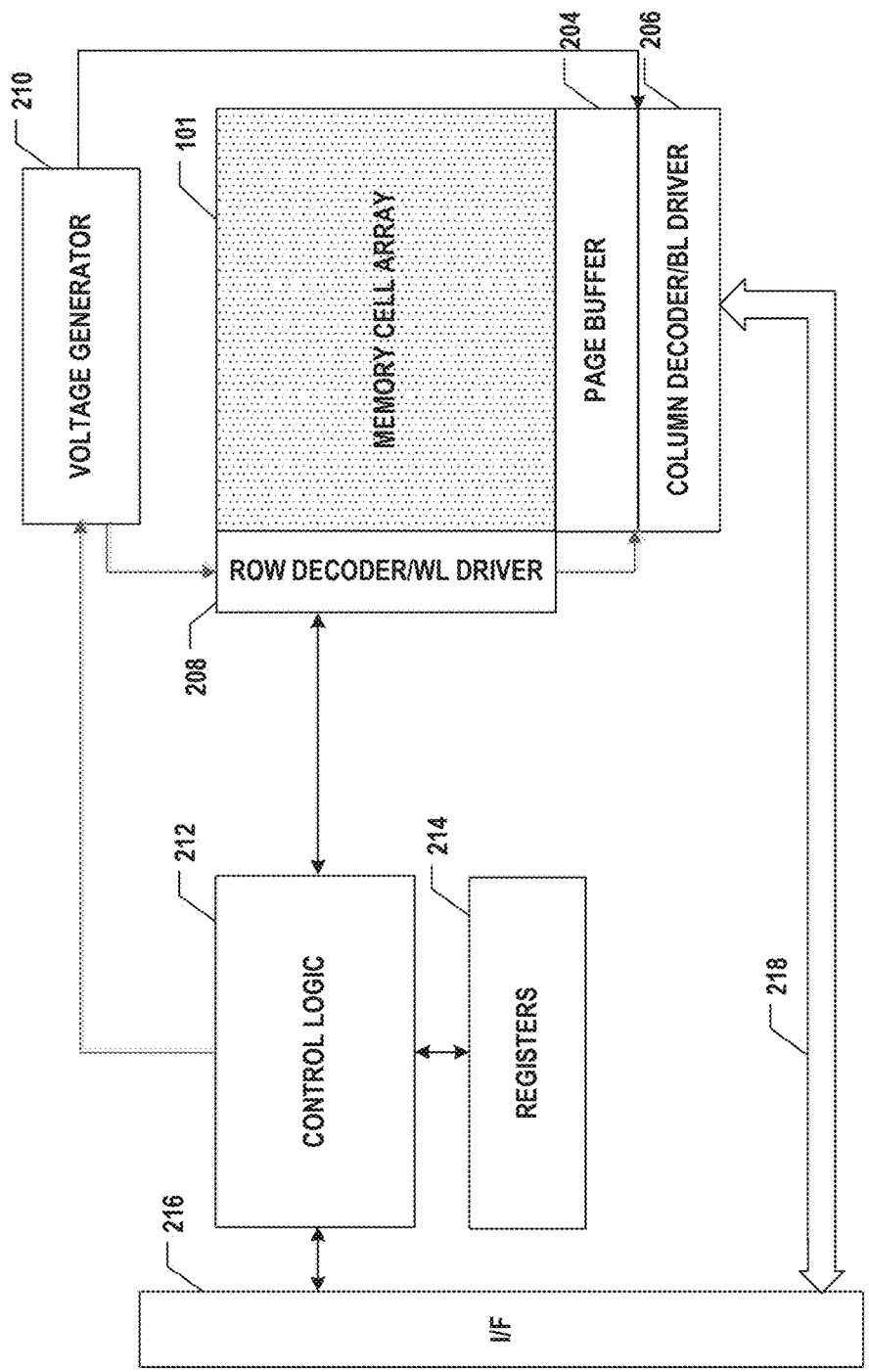
FIG. 2 illustrates a block diagram of an example memory device including a memory cell array and peripheral circuits, according to some implementations of the present disclosure.

Peripheral circuits 102 can be coupled to memory cell array 101 through bit lines 116, word lines 118, source lines 114, SSG lines 115, and DSG lines 113. As described above, peripheral circuits 102 can include any suitable circuits for facilitating the operations of memory cell array 101 by applying and sensing voltage signals and/or current signals through bit lines 116 to and from each target memory cell 106 through word lines 118, source lines 114, SSG lines 115, and DSG lines 113. Peripheral circuits 102 can include various types of peripheral circuits formed using complementary metal-oxide semiconductor (CMOS) technologies. For example, FIG. 2 illustrates example peripheral circuits 102 including a page buffer 204, a column decoder/bit line driver 206, a row decoder/word line driver 208, a voltage generator 210, control logic 212, registers 214, an interface (I/F) 216, and a data bus 218. It is understood that in some examples, additional peripheral circuits 102 may be included as well.

Page buffer 204 can be configured to buffer data read from or programmed to memory cell array 101 according to the control signals of control logic 212. In one example, page buffer 204 may store one or more pages of program data (write data) to be programmed into one or more rows of memory cell array 101. In another example, page buffer 204 also performs program verify operations to ensure that the data has been properly programmed into memory cells 106 coupled to selected word lines 118.

Row decoder/word line driver 208 can be configured to be controlled by control logic 212 and select or unselect a block 104 of memory cell array 101 and select or unselect a word line 118 of selected block 104. Row decoder/word line driver 208 can be further configured to drive memory cell array 101. For example, row decoder/word line driver 208 may drive memory cells 106 coupled to the selected word line 118 using a word line voltage generated from voltage generator 210. In some implementations, row decoder/word line driver 208 can include a decoder and string drivers (driving transistors) coupled to local word lines and word lines 118.

Voltage generator 210 can be configured to be controlled by control logic 212 and generate the word line voltages (e.g., read voltage, program voltage, pass voltage, local voltage, verification voltage, etc.) to be supplied to memory cell array 101. In some implementations, voltage generator 210 is part of a voltage source that provides voltages at various levels of different peripheral circuits 102 as described below in detail. Consistent with the scope of the present disclosure, in some implementations, the voltages provided by voltage generator 210, for example, to row decoder/word line driver 208 and page buffer 204 are above certain levels that are sufficient to perform the memory operations. For example, the voltages provided to page buffer 204 may be between 2 V and 3.3 V, such as 3.3 V, and the voltages provided to row decoder/word line driver 208 may be greater than 3.3 V, such as between 3.3 V and 30 V.

Column decoder/bit line driver 206 can be configured to be controlled by control logic 212 and select one or more 3D NAND memory strings 108 by applying bit line voltages generated from voltage generator 210. For example, column decoder/bit line driver 206 may apply column signals for selecting a set of N bits of data from page buffer 204 to be outputted in a read operation.

Control logic 212 can be coupled to each peripheral circuit 102 and configured to control operations of peripheral circuits 102. Registers 214 can be coupled to control logic 212 and include status registers, command registers, and address registers for storing status information, command operation codes (OP codes), and command addresses for controlling the operations of each peripheral circuit 102.

Interface 216 can be coupled to control logic 212 and configured to interface memory cell array 101 with a memory controller (not shown). In some implementations, interface 216 acts as a control buffer to buffer and relay control commands received from the memory controller and/or a host (not shown) to control logic 212 and status information received from control logic 212 to the memory controller and/or the host. Interface 216 can also be coupled to page buffer 204 and column decoder/bit line driver 206 via data bus 218 and act as an Input/Output (I/O) interface and a data buffer to buffer and relay the program data received from the memory controller and/or the host to page buffer 204 and the read data from page buffer 204 to the memory controller and/or the host. In some implementations, interface 216 and data bus 218 are part of an I/O circuit of peripheral circuits 102.

Figure 3A:
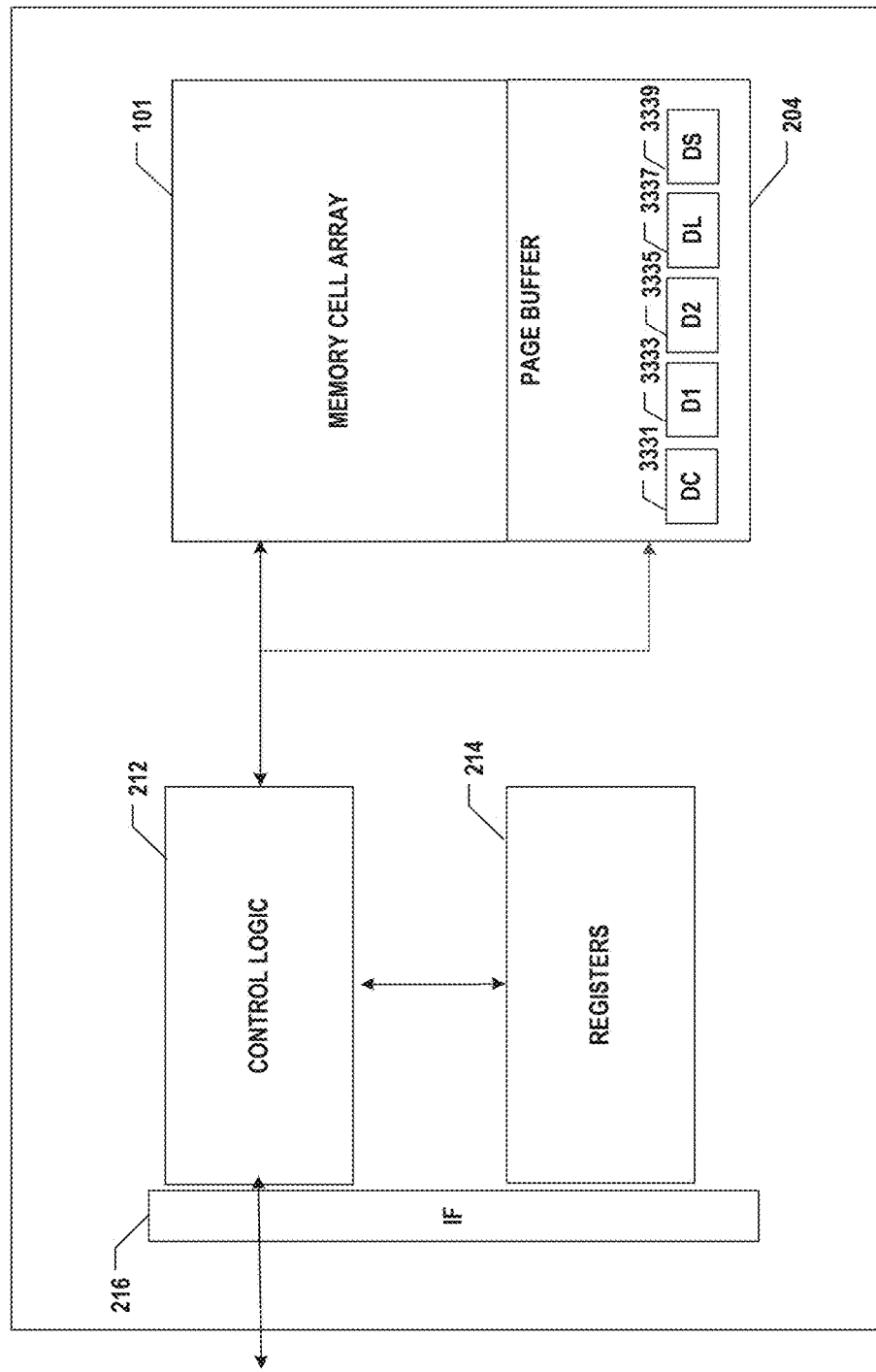
FIG. 3A illustrates a block diagram of an example memory device including a page buffer, according to some implementations of the present disclosure.

FIG. 3A illustrates an example memory device 100 including one or more page buffers 204, memory cell array 101, control logic 212 coupled to page buffer 204 and memory cell array 101, registers 214 coupled to control logic 212, and interface (I/F) 216. It is understood that in some examples, additional components may be included as well. Page buffer 204 may include one or more latches. In some implementations, page buffer 204 may include a cache latch (DC) 3331, (N−1) data latches (D1 to DN−1) (e.g., a first data latch (D1) 3333 and a second data latch (D2) 3335), a bias latch (DL) 3337, and a main latch (DS) 3339, where N is an integer and more than 1. It is noted that the names of the latches are for illustration purposes according to their usages and/or data stored in and not limited to the specific latch in the page buffer. All or some of these latches can be replaced by other latches in the page buffer.

Latches (e.g., DC 3331, D1 3333, D2 3335, DL 3337, or DS 3339) of page buffer 204 may store one or more pages of program data (write data) to be programmed into one or more rows of memory cell array 101. These latches in the page buffer may also store related data in order to perform program verify operations to ensure that the data has been properly programmed into memory cells 106 coupled to selected word lines 118. These latches in the page buffer may also store related data in order to perform data recovery operation to retrieve data, given that data being programmed is unsuccessfully.

Figure 3B:
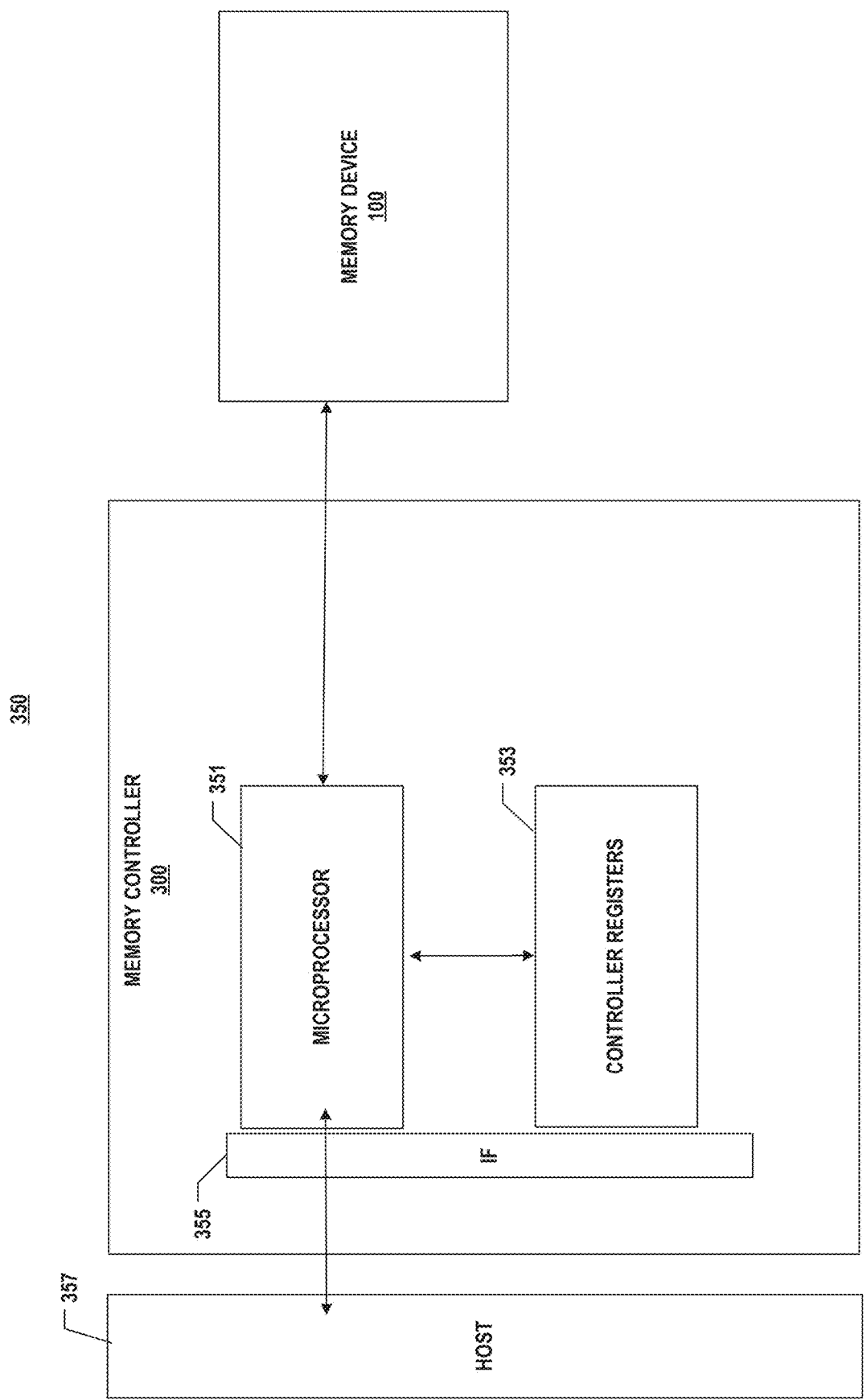
FIG. 3B illustrates a block diagram of an example memory system including a memory controller and a memory device, according to some implementations of the present disclosure.

FIG. 3B illustrates an example memory system 350 including a memory controller 300 and memory device 100, according to some implementations of the present disclosure. Memory controller 300 includes a microprocessor 351, controller registers 353 coupled to microprocessor 351, controller interface (I/F) 355 coupled between microprocessor 351 and a host 357.

Memory controller 300 may manage data stored in memory device 100 and communicate with host 357. Memory controller 300 may be configured to control operations of memory device 100, such as read, erase, program operations, data recovery operations, or other operations according to some implementations of the present disclosure. Memory controller 300 may be configured to control the operations by sending a command (e.g., a read command) or a command with data addresses. In some implementations, memory controller 300 may also include a controller memory (such as a cache memory or a non-volatile memory) storing tables, verify information, fail bit count information, or other information in the implementations of the present disclosure. Memory controller 300 may also be configured to manage various functions with respect to data stored or to be stored in memory device 100, including but not limited to bad block management, garbage collection, logical to physical address transfer, and wear leveling. In some implementations, memory controller 300 is also configured to process error correction codes (ECC) with respect to data read from or written to memory device 100. Memory controller 300 may also perform any other suitable function, such as formatting memory device 100. For example, memory controller 300 may communicate with external devices (e.g., host 357) according to a particular communication protocol. Host 357 may be a processor (e.g., a central processing unit (CPU)) or a system on a chip (SoC) (e.g., an application processor (AP)) of the electronic device. Host 357 may be configured to send data to or receive data from memory device 100 via memory controller 300.

FIG. 4A illustrates a table including corresponding data in an example page buffer during an operation of an example memory device, according to various embodiments of the present disclosure.

First, during a program prologue stage (e.g., a program preparation process), a first programing operation starts, and a first user data is received from host 357 via memory controller 300 to control logic 212 and converted as a first page data (e.g., the current program data) to page buffer 204. A cache latch (e.g., DC 3331) of page buffer 204 is configured to store the current program data (write data, or data to be programmed, also referred to herein as the "page data") at this stage. It is noted that under SLC architecture, only one bit of data being stored. As such, one page of data is all needed. Therefore, each latch may store at least a page of data, and during the program stage, the latch can directly transfer the page of data from the latch to the current page to be programmed. The state bits of the DC for the cell of program state is 0 and for the cell of erase state is 1 at this stage.

Next, during the last program data backup stage, the last program data stored in first data latch (e.g., D1 3333) of page buffer 204 during the last program operation is transferred to second data latch (e.g., D2 3335) of page buffer 204. The state bits of the D2 for the cell of program state is 0 and for the cell of erase state is 1 at this stage.

Next, after the last program data in D1 is transferred and stored to D2, the last program data D1 can be erased and covered by the current program data. As such, during the (current) data transfer stage, the current program data stored in DC is transferred to D1. The state bits of the D1 for the cell of program state is 0 and for the cell of erase state is 1 at this stage.

Next, after the current program data in DC is transferred and stored to D1, the current program data in DC can be erased and covered by the next program data. For example, the next user data can be received and converted to the next program data to be stored in the page buffer. Specifically, during the next page data cache-in stage, the next program data is transferred and stored in DC. The state bits of the DC for the cell of program state are 0 and for the cell of erase state is 1 at this stage.

Next, during a first program inhibit process, the inhibit information of memory cells the program pulse is applied to is configured according to the current page data. A main latch (e.g., DS 3339) of page buffer 204 is configured to store the inhibit information (e.g., the program pulse data in D1). The inhibit information may correspond to a cell of erase state of the target level. The state bits of the DS for the cell of program state is 0 and for the cell of erase state is 1 at this stage. The inhibit information may then be used to inhibit the memory cells from being programmed by using the current program data stored in D1.

Next, after the program prologue stage, the first program pulse stage starts. During the first program pulse stage, the current program data stored in DC is transferred and programmed to the memory cell array (e.g., memory cell array 101).

Next, after the current page of the memory cell array is programmed, a first program verify starts. During the first program verify, a verify preset process may be performed, and the verify preset information may be stored in DS. For example, the inverted data in DS (i.e., the inverted data of the program data stored in D1) is transferred and stored in DS. The inverted data in DS may be used to setup the cells to be verified (i.e., the cell being programmed in the current page). The state bits of the DS for the cell of erase state and the cell of pass state is 0 and for the cell of verify state is 1 at this stage.

Next, during the verify sensing in the first program verify, the verify information may be stored in DS. For example, the inverted data in DS (i.e., the inverted data of the verify preset stored in DS) and the inverted sense out (SO) node date are transferred and stored in DS. It is noted that SO node is a node which senses a cell current/voltage in read operation. It is also the sense-out node during data transferring between latches. The voltage level of the SO node changes according to the program state of the cell being programmed in the current page. For example, if the voltage level of the SO node remains logic high, the cell of the current page is programmed, and if the voltage level of the SO node remains logic low, the cell of the current page is not programmed. The state bits of the DS for the cell of erase state and the cell of pass state is 0 and for the cell of fail state is 1 at this stage.

Next, during the verify fail bit count (VFC) setup stage after verify sensing in the first program verify, the VFC may be stored in other part of the page buffer or in a memory of the memory controller. At this stage, a bias latch (e.g., DL 3337) of page buffer 204 is configured to store the verify failure information (e.g., verify result) stored in DS. The data stored in DL is whether one of the memory cells has been verified or not. The state bits of the DL for the cell of erase state and the cell of pass state is 0 and for the cell of erase state is 1 at this stage.

Next, during the verify recovery stage in the first program verify, the inverted data in DS (i.e., the inverted data of the verify sensing stored in DS) is transferred and stored in DS.

The state bits of the DS for the cell of program state is 0 and for the cell of erase state and the cell of pass state are 1 at this stage.

Figure 4B:
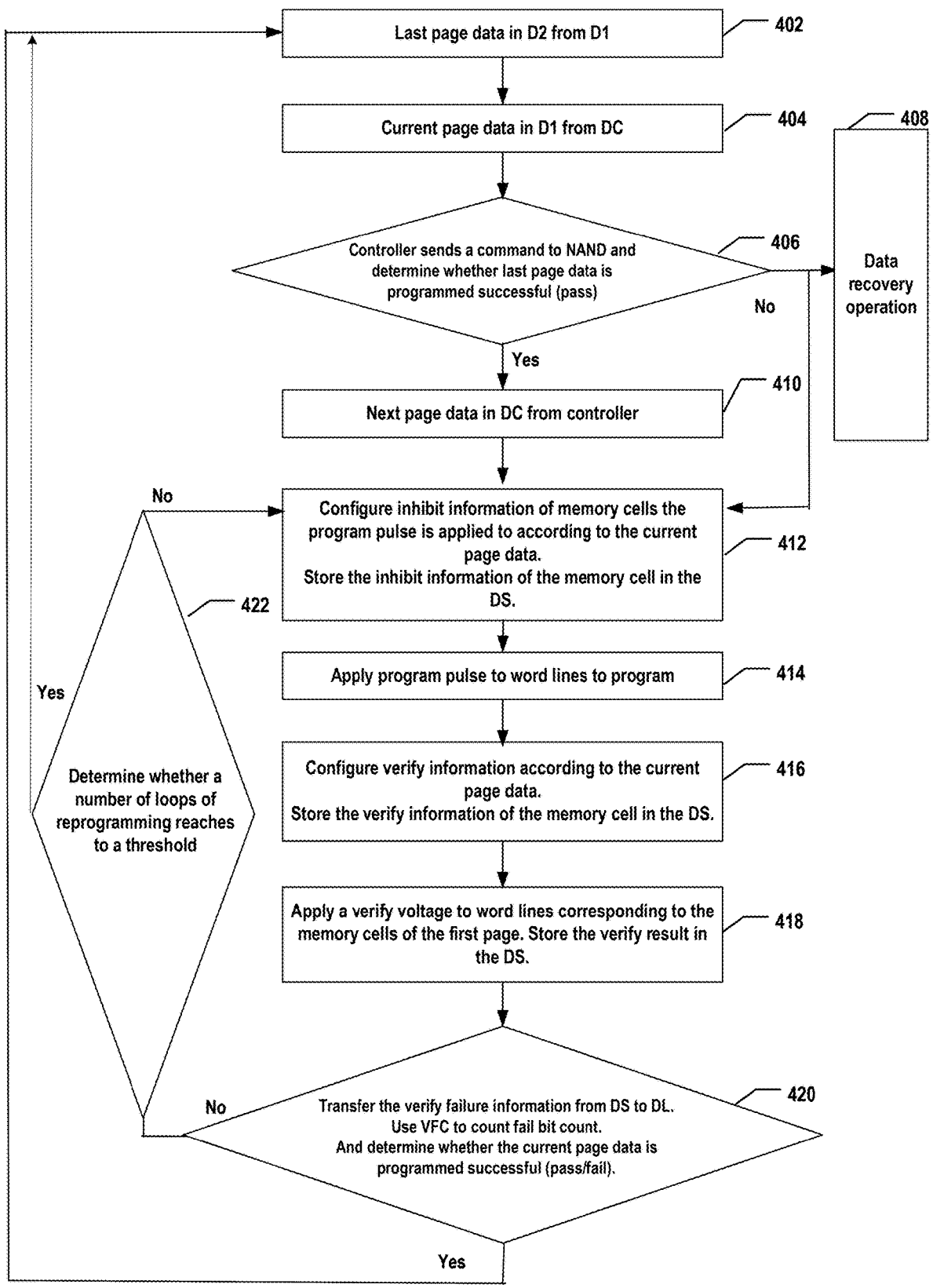
FIG. 4B illustrates a flowchart for operating an example memory device, according to various embodiments of the present disclosure.

FIG. 4B illustrates a flowchart for operating an example memory device, according to various embodiments of the present disclosure. It is noted that the latches described herein are for illustration purposes. All or a part of these latches can be replaced by or switched with other latches.

First, at operation 402, last page data stored in first data latch (e.g., D1 3333) of page buffer 204 during the last program is transferred and stored in second data latch (e.g., D2 3335) of page buffer 204.

Next, at operation 404, after the last page data is retrieved, user data of the current page is sent from the memory controller (e.g., memory controller 300) to page buffer 204 and converted to the current page data. The current page data originally stored in cache latch (e.g., DC 3331) is transferred and stored in first data latch (e.g., D1 3333).

Next, at operation 406, the memory controller (e.g., memory controller 300) may send a command to the memory device (e.g., memory device 100) and determine whether the last page data is programmed successfully (pass) or not (fail). If the last page data is determined to be programmed unsuccessful (fail), the memory controller does not send the next page data to the memory device, and the memory device continues to write in current page data instead of the next page data. As such, a data recovery operation (e.g., operation 408) may be performed instead. The data recovery operation will be discussed later. On the contrary, if the last page data is determined to be programmed successfully (pass), at operation 410, the next page data is sent from the memory controller to the cache latch DC.

Next, at operation 412, inhibit information of memory cells to which the program pulse are applied is configured according to the current page data. As mentioned above, the inhibit information of the memory cell of the current page (e.g., the first page) is stored in the main latch (e.g., DS 3339). In particular, the inhibit information stored in DS corresponds to the cells of erase state of the target level.

Next, at operation 414, a program pulse is applied to word lines corresponding to the memory cells of the current page (e.g., the first page) to program the memory cells of the current page.

Next, at operation 416, after the pulse program, verify information is configured according to the current page data. The verify information of the memory cell to be verified is stored in the DS. In particular, because the current data stored in the DS corresponding to the memory cells of erase state, and the memory cells to be verified are in a first program level (P1) which is opposite to the memory cells of erase state, the data stored in the DS can be inverted to the verify information of the memory cell to be verified.

Next, at operation 418, a verify voltage is applied to word lines corresponding to the memory cells of the current page (e.g., the first page), and a verify result is stored in the DS. The verify result is whether the memory cells in the current page pass or fail. The verify failure information can be opposite to the verify information. As such, the verify result (e.g., the verify failure information) can be inverted data of the verify information.

Next, at operation 420, the verify failure information is transferred from DS to bias latch (e.g., DL 3337). In some implementations, verify fail bit count (VFC) can be used to count the number of memory cells that fail to be written or have errors during VFC setup stage after verify sensing in the first program verify, the fail bit count may be stored in other part of the memory device (e.g., other latches in the page buffer) or the memory controller (e.g., a memory, such as cache memory or non-volatile memory, in the memory controller), to determine whether the current page data is programmed successful (pass/fail). For example, if the fail bit count reaches a count threshold, it may determine that the current page data is programmed unsuccessful (fail). It is noted that, in some implementations, the memory controller may not be informed by the result of whether the current page data is programmed successful (pass/fail) actively. The memory controller needs a command to call out the result so as to start the data recovery process. In another example, if the fail bit count does not reach the count threshold, it may determine that the current page data is programmed successful (pass). If the current page data is programmed successfully, then operation 402 of a second program process can be started and the entire cache program process is performed to program the next page data. If the current page data is programmed unsuccessfully, it means that the memory cells of the current page (e.g., the first page) should be reprogrammed using the same current page data. As such, at operation 422, whether a number of loops of reprogramming reaches a threshold is determined. That is, in order to prevent the memory cells not being able to reprogram anymore (for example, the memory cells are totally damaged), once the number of loops of reprograming reaches to a threshold, for example, 10 to 1000 times, it may stop the reprograming process and start the next program process (i.e., start the operation 402 of the second program process). And in determining that the current page data is programmed unsuccessfully and the number of loops of reprogramming does not reach to the threshold, the operation 412 is performed to configure the inhibit information and then another pulse program operation 414 is performed to program the memory cell with the current page data again.

Figure 4C:
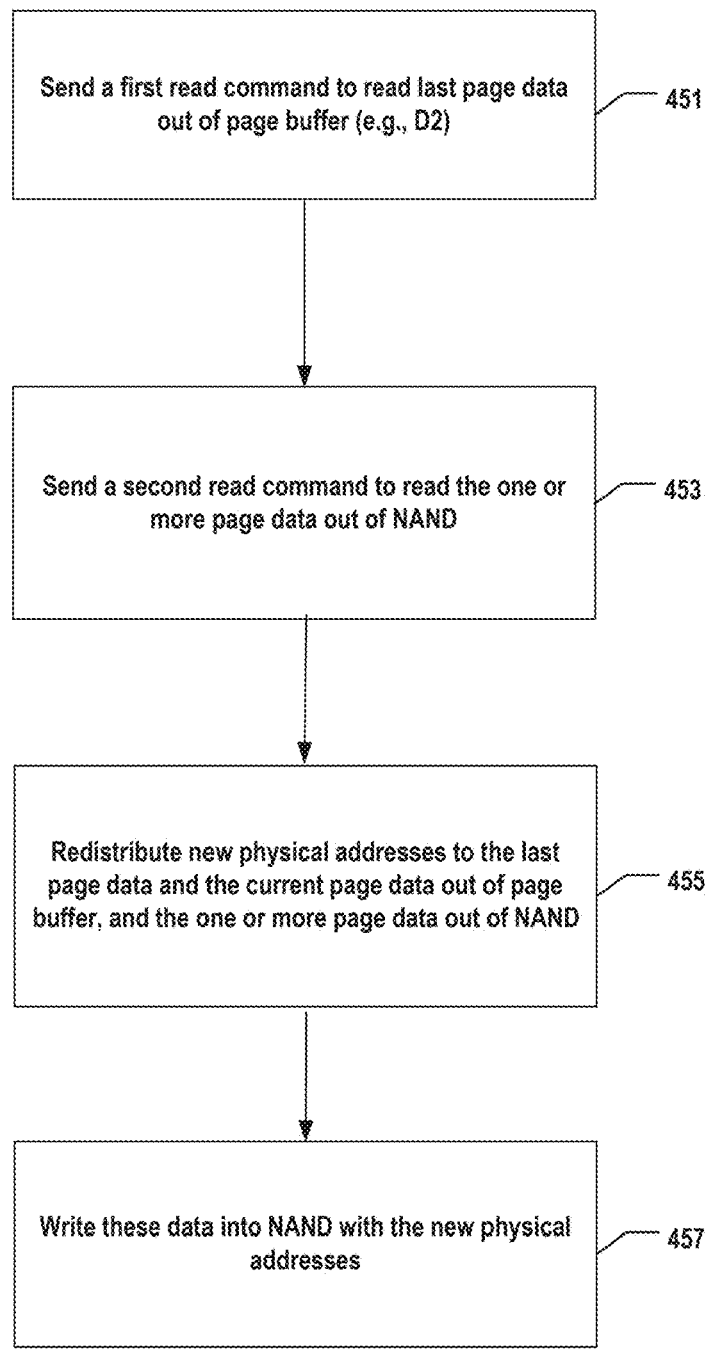
FIG. 4C illustrates a flowchart for operating an example memory system, according to various embodiments of the present disclosure.
Figure 4D:
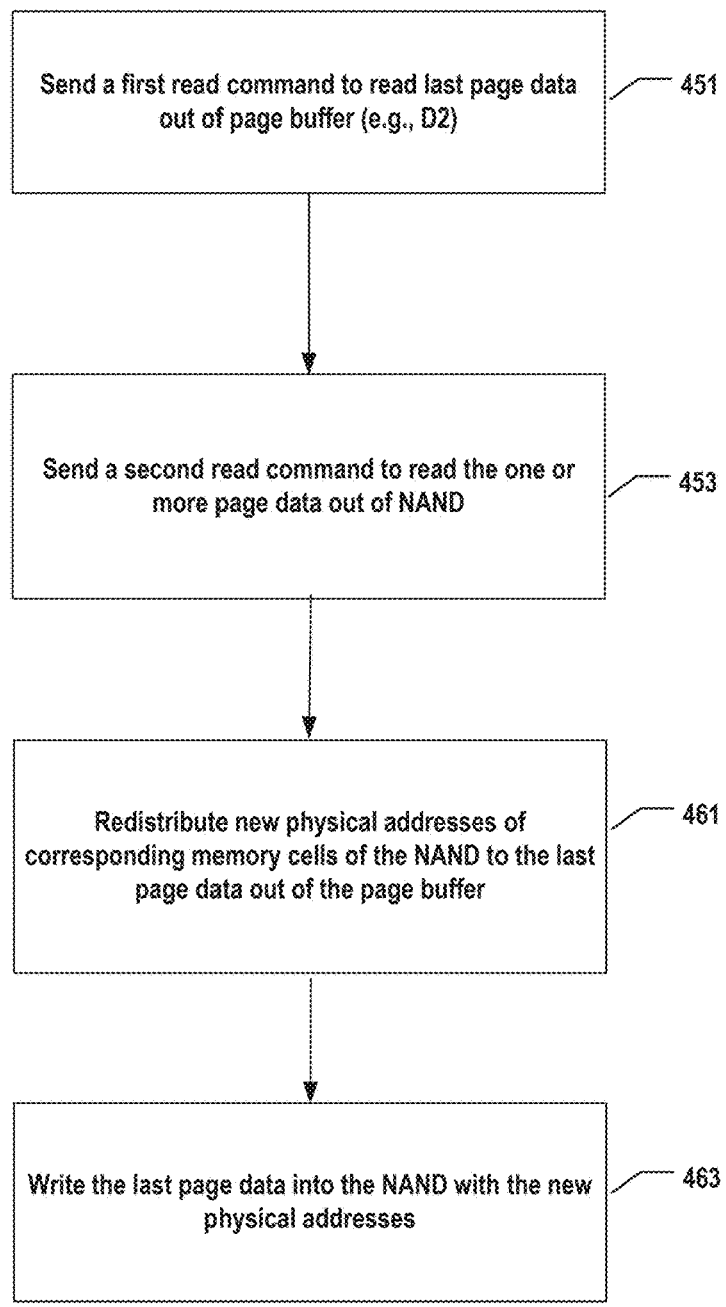
FIG. 4D illustrates a flowchart for operating an example memory system, according to various embodiments of the present disclosure.
Figure 4E:
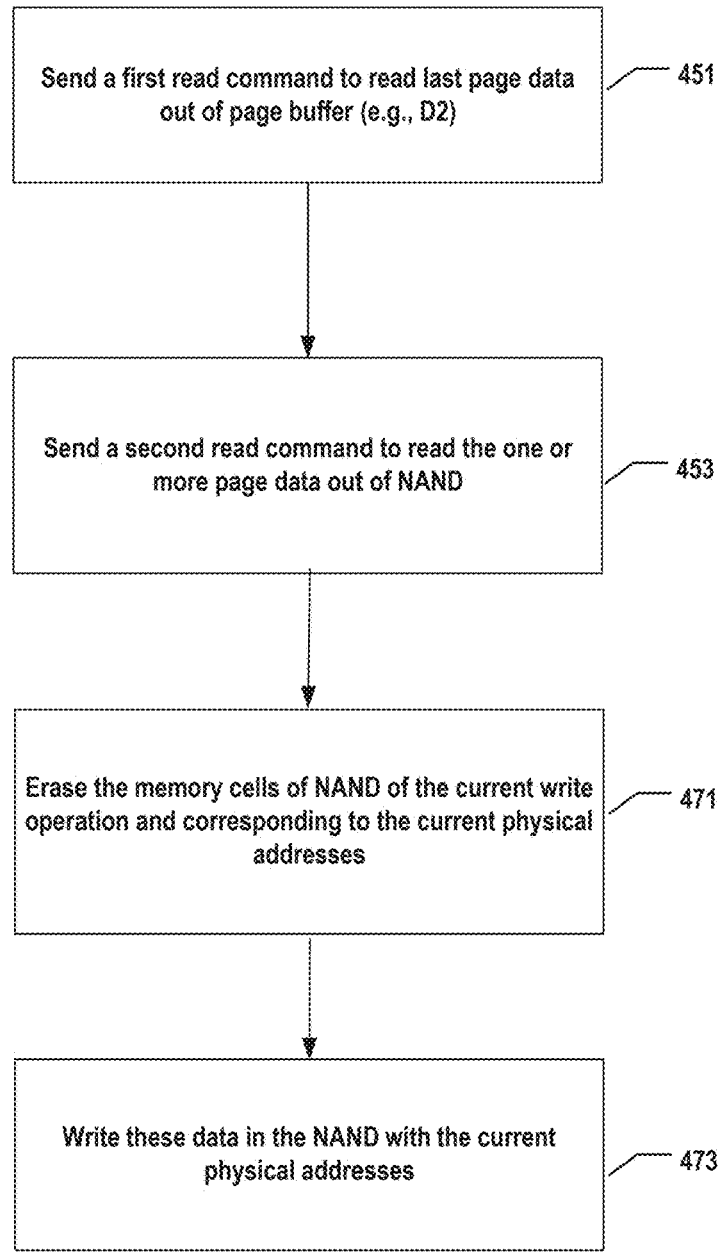
FIG. 4E illustrates a flowchart for operating an example memory system, according to various embodiments of the present disclosure.

FIGS. 4C to 4E illustrate flowcharts of performing the data recovery operation 408, according to various embodiments of the present disclosure.

In a first type of data recovery operation 408-1, as shown in FIG. 4C, the operation starts at operation 451 in which a first read command is sent from the memory controller to the memory device to read out the last page data in the page buffer (e.g., in D2). It is noted that, in some implementations, before sending the first read command, the memory controller may check whether the memory device is in an idle state (i.e., once the process of pulse programming of the current page data is completed, the memory device becomes in the idle state). If it is determined that the memory device is in the idle state, operation 451 starts and the first read command is sent. And, if it is determined that the memory device is not in the idle state, the memory controller may wait for the completion of the pulse programming of the current page data, and starts operation 451 until the memory device turns to the idle state. Next, the operation proceeds to operation 453 in which a second read command is sent from the memory controller to the memory device to read out the one or more page data in the memory cell array. Next, the operation proceeds to operation 455 in which new physical addresses in the memory cell array corresponding to the last page data and the current page data (which are stored temporarily in the latches of the page buffer), and the one or more page data in the memory cell array, are redistributed. Next, after redistributing the new physical addresses in the memory cell array for these page data, the operation proceeds to operation 457 in which these page data are written to the memory cell array with the new physical addresses. That is, the last page data, the current page data, and the original page data are all restored into the new physical addresses in the memory cell array, the data recovery process is completed. As such, even if the last page data is programmed unsuccessful, the data recovery process restores the last page data, the current page data, and the original page data. The programming of the last page data and the current page data may be repeated (e.g., proceed to operation 412) without proceeding to program with the next page data (e.g., skip operation 410).

In a second type of data recovery operation 408-3, as shown in FIG. 4D, the operation starts at operation 451 in which the first read command is sent from the memory controller to the memory device to read out the last page data in the page buffer (e.g., in D2). Next, the operation proceeds to operation 453 in which the second read command is sent from the memory controller to the memory device to read out the one or more page data in the memory cell array. Next, the operation proceeds to operation 461 in which new physical addresses in the memory cell array corresponding to the last page data (which are stored temporarily in the latches of the page buffer), are redistributed. Next, after redistributing the new physical addresses in the memory cell array for the last page data, the operation proceeds to operation 463 in which the last page data are written to the memory cell array with the new physical addresses. That is, only the last page data is restored into the new physical addresses in the memory cell array, and the data recovery process is completed. As such, even if the last page data is programmed unsuccessful, the data recovery process restores the last page data and stored the last page data into the new physical addresses. The programming of the last page data may be repeated (e.g., proceed to operation 412) without proceeding to program with the next page data (e.g., skip operation 410).

In a third type of data recovery operation 408-5, as shown in FIG. 4E, the operation starts at operation 451 in which the first read command is sent from the memory controller to the memory device to read out the last page data in the page buffer (e.g., in D2). Next, the operation proceeds to operation 453 in which the second read command is sent from the memory controller to the memory device to read out the one or more page data in the memory cell array. Next, the operation proceeds to operation 471 in which the memory cells corresponding to the current physical addresses executing the current write operation are erased. Next, the operation proceeds to operation 473 in which the last page data, the current page data, and the one or more page data in the memory cell array are written to the memory cell array with the current physical addresses corresponding to the current write operation. That is, the last page data, the current page data, and the original page data are all restored into the physical addresses being erased, the data recovery process is completed. Since the current physical addresses of the current page are erased and the last page data, the current page data, and the one or more page data in the memory cell array are written into the current physical addresses being erased, it does not require to use new addresses.

Figure 5:
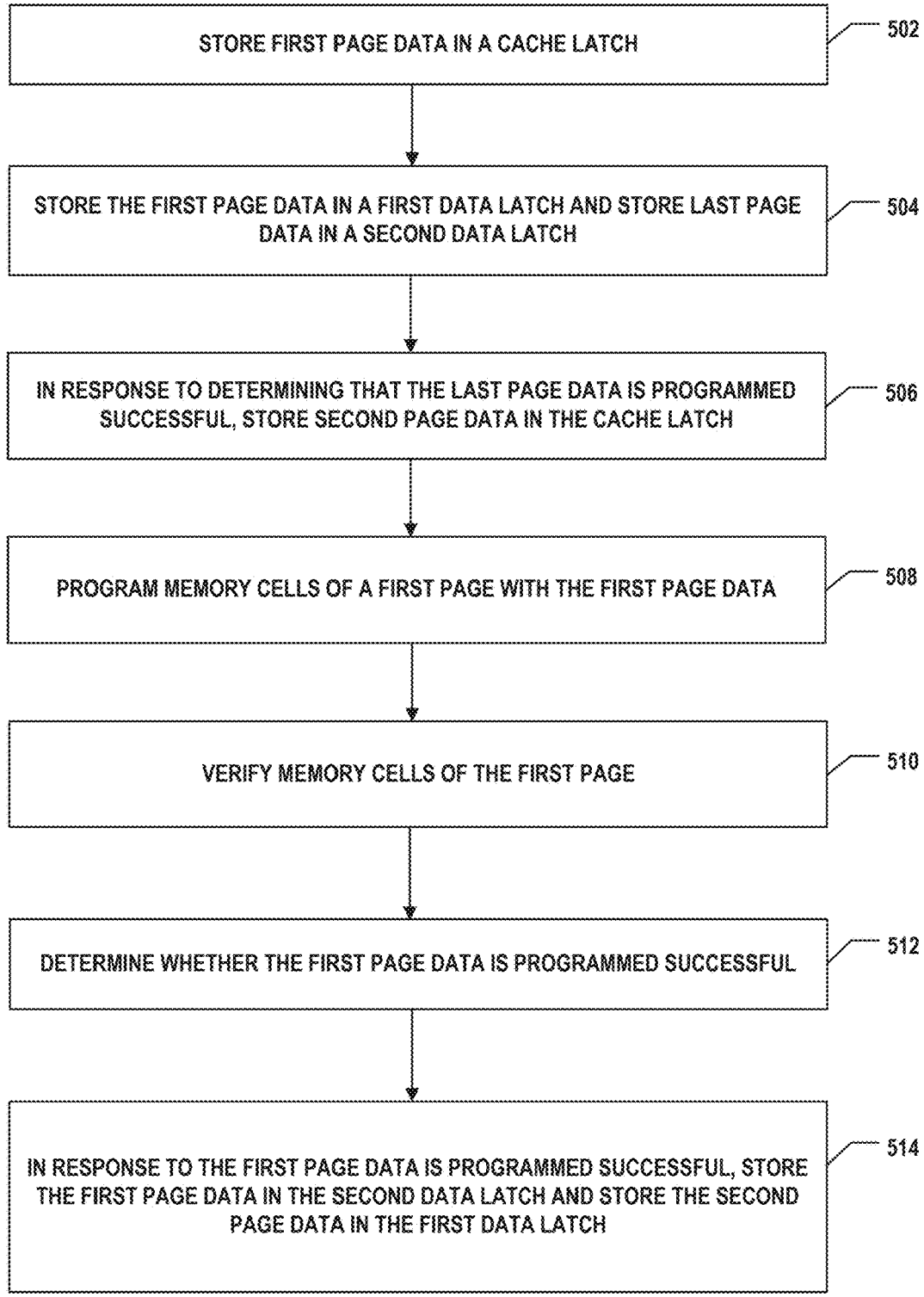
FIG. 5 illustrates a flowchart for operating an example memory device, according to various embodiments of the present disclosure.

FIG. 5 illustrates a flowchart for operating an example memory device, according to various embodiments of the present disclosure. Referring to FIG. 5, method 500 starts at operation 502, in which first page data is stored in a cache latch to start a first program operation. Next, method 500 proceeds to operation 504, in which the first page data is stored in first data latch and last page data is stored in a second data latch. Since the first page data in the cache latch is transferred, method 500 proceeds to operation 506, in which, in response to determining that the last page data is programmed successfully, second page data is stored in the cache latch. Next, method 500 proceeds to operation 508, in which memory cells of a first page is programmed with the first page data stored in the first data latch. The program operation (e.g., the pulse program) can be any pulse program operation in the implementations of the present disclosure. Next, method 500 proceeds to operation 510, in which the memory cells of the first page are verified according to any verify operation in the implementations of the present disclosure. Next, method 500 proceeds to operation 512, in which whether the first page data is programmed successfully is determined. And, next, method 500 proceeds to operation 514, in which, in response to the first page data is programmed successful, the first page data is stored in the second data latch, and the second page data is stored in the first data latch to start a second program operation. The detailed processes of these operations may refer to the implementations of the present disclosure, such as the implementations in FIGS. 4A-4E.

Figure 6:
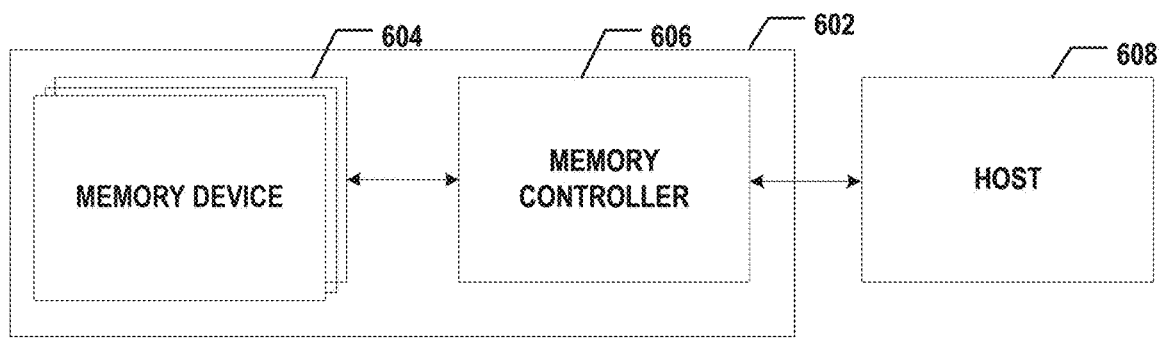
FIG. 6 illustrates a block diagram of an example system having a memory device, according to some implementations of the present disclosure.

FIG. 6 illustrates a block diagram of a system 600 having a memory device, according to some aspects of the present disclosure. System 600 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 6, system 600 can include a host 608 and a memory system 602 having one or more memory devices 604 and a memory controller 606. Host 608 can be a processor of an electronic device, such as a central processing unit (CPU), or a system-on-chip (SoC), such as an application processor (AP). Host 608 can be configured to send or receive the data to or from memory devices 604.

Memory devices 604 can be any memory devices disclosed herein, such as memory devices 100. In some implementations, each memory device 604 includes a memory device, as described above in detail.

Memory controller 606 is coupled to memory device 604 and host 608 and is configured to control memory device 604, according to some implementations. Memory controller 606 can be any memory controllers disclosed herein, such as memory controller 300. In some implementations, each memory controller 606 includes a memory controller, as described above in detail. Memory controller 606 can manage the data stored in memory device 604 and communicate with host 608. In some implementations, memory controller 606 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 606 is designed for operating in a high duty-cycle environment SSDs or embedded multi-media-cards (eMMCs) used as data storage for mobile devices, such as smartphones, tablets, laptop computers, etc., and enterprise storage arrays. Memory controller 606 can be configured to control operations of memory device 604, such as read, erase, and program operations. Memory controller 606 can also be configured to manage various functions with respect to the data stored or to be stored in memory device 604 including, but not limited to bad-block management, garbage collection, logical-to-physical address conversion, wear leveling, etc. In some implementations, memory controller 606 is further configured to process error correction codes (ECCs) with respect to the data read from or written to memory device 604. Any other suitable functions may be performed by memory controller 606 as well, for example, formatting memory device 604. Memory controller 606 can communicate with an external device (e.g., host 608) according to a particular communication protocol. For example, memory controller 606 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figures 7A, 7B:
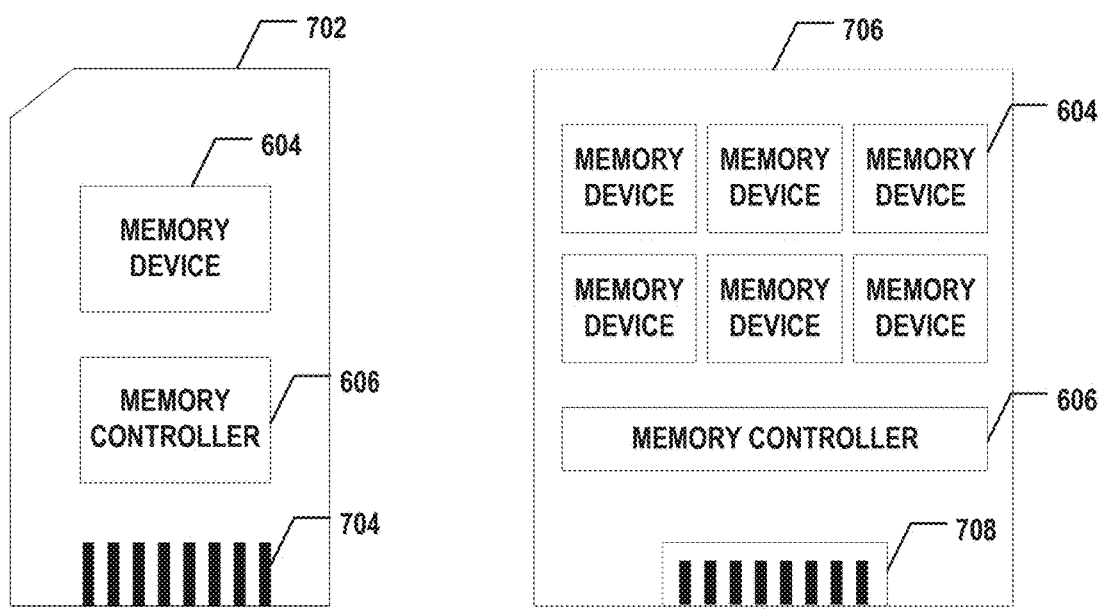
FIG. 7A illustrates a diagram of an example memory card having a memory device, according to some implementations of the present disclosure.
FIG. 7B illustrates a diagram of an example solid-state drive (SSD) having a memory device, according to some implementations of the present disclosure.

Memory controller 606 and one or more memory devices 604 can be integrated into various types of storage devices, for example, be included in the same package, such as a universal Flash storage (UFS) package or an eMMC package. That is, memory system 602 can be implemented and packaged into different types of end electronic products. In one example as shown in FIG. 7A, memory controller 606 and a single memory device 604 may be integrated into a memory card 702. Memory card 702 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 702 can further include a memory card connector 704 coupling memory card 702 with a host (e.g., host 608 in FIG. 6). In another example as shown in FIG. 7B, memory controller 606 and multiple memory devices 604 may be integrated into an SSD 706. SSD 706 can further include an SSD connector 708 coupling SSD 706 with a host (e.g., host 608 in FIG. 6). In some implementations, the storage capacity and/or the operation speed of SSD 706 is greater than those of memory card 702.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for operating a memory device, comprising:
   storing first page data in a cache latch;
   storing the first page data in a first data latch and storing last page data in a second data latch;
   programming memory cells of a first page of a memory array with the first page data;
   storing the first page data in the second data latch and storing second page data in the first data latch; and
   programming memory cells of a second page with a second page data.

2. The method of claim 1, wherein before programming memory cells of a first page of a memory array with the first page data, the method further comprises:
   determining whether the last page data is programmed successfully.

3. The method of claim 2, wherein in response to determining that the last page data is programmed successfully, the method further comprises:
   storing the second page data in the cache latch.

4. The method of claim 2, wherein in response to determining that the last page data is not programmed successfully, the method further comprises:
   reading out the last page data in the second data latch;
   reading out the first page data in the first data latch; and
   reading out one or more page data in the memory cells of the memory array.

5. The method of claim 4, wherein reading out the one or more page data in the memory cells of the memory array is triggered in response to a first read command, and wherein reading out the first page data in the first data latch and the last page data in the second data latch is triggered in response to a second read command.

6. The method of claim 1, wherein programming memory cells of a first page with the first page data comprises:
   applying a program pulse to word lines corresponding to the memory cells of the first page according to the first page data; and
   verifying the memory cells of the first page.

7. The method of claim 6, wherein programming memory cells of a first page with the first page data comprises:
   configuring inhibit information of the memory cells the program pulse is applied to; and
   storing the inhibit information of the memory cells in a main latch.

8. The method of claim 6, wherein verifying the memory cells of the first page comprises: storing a verify information of the memory cells in a main latch.

9. The method of claim 8, wherein verifying the memory cells of the first page further comprises:
   storing a verify result in the main latch.

10. The method of claim 1, further comprises:
    determining whether the first page data is programmed successfully.

11. The method of claim 10, wherein in response to determining the first page data is programmed successfully, the method further comprises:
    storing the first page data in the second data latch and storing the second page data in the first data latch.

12. The method of claim 10, wherein in response to determining the first page data is programmed not successfully, the method further comprises:
    determining whether a number of loops of reprogramming reaches to a loop threshold, and
    in response to determine that the number of loops of reprogramming reaches to the loop threshold, the method further comprises:
    storing the first page data in the second data latch and storing the second page data in the first data latch.

13. The method of claim 12, wherein in response to determine that the number of loops of reprogramming does not reach to the loop threshold, the method further comprises:
    applying a program pulse to word lines corresponding to the memory cells of the first page according to the first page data.

14. The method of claim 1, wherein each memory cell in the memory device is a Single-level cell (SLC).

15. A memory device, comprising:
    a memory cell array comprising memory cells;
    a peripheral circuit coupled to the memory cell array comprising:
    a page buffer coupled to the memory cell array, wherein the page buffer comprises:
    a cache latch;
    a first data latch; and
    a second data latch; and a control logic coupled to the memory cell array, wherein the peripheral circuit is configured to:
store first page data in the cache latch;
store last page data in the second data latch and store the first page data in the first data latch;
store second page data in the cache latch;
program memory cells of a first page of the memory cell array with the first page data;
store the first page data in the second data latch and store the second page data in the first data latch; and
program memory cells of a second page of the memory cell array with the second page data.

16. A memory system, comprising:
a memory device; and
a memory controller coupled to the memory device, wherein the memory device comprises:
a memory cell array comprising memory cells; and
a peripheral circuit coupled to the memory cell array comprising:
a page buffer coupled to the memory cell array;
wherein the memory controller is configured to:
send an inquiry command to the memory cell array to confirm whether last page data is programmed successful; and
in response to the last page data is programmed not successful, send a first read command to read out first page data and the last page data in the page buffer.

17. The memory system of claim 16, wherein the memory controller is configured to, in response to the last page data is programmed not successfully, send a second read command to read out one or more page data in the memory cells of the memory cell array.

18. The memory system of claim 16, wherein after sending a first read command to read out one or more page data in the memory cells of the memory cell array, and sending a second read command to read out first page data in a first data latch and the last page data in a second data latch, the memory controller is further configured to:
redistribute new physical addresses of corresponding memory cells of the memory cell array to the last page data and a current page data of the page buffer, and the one or more page data of the memory cell array; and
program the last page data, the current page data, and the one or more page data into the memory cell array with the new physical addresses.

19. The memory system of claim 16, wherein after sending a first read command to read out one or more page data in the memory cells of the memory cell array, and sending a second read command to read out first page data and the last page data in the page buffer, the memory controller is further configured to:
erase the memory cells corresponding to current physical addresses executing current program operation; and
program the last page data, current page data, and the one or more page data into the memory cell array with the current physical addresses.

20. The memory system of claim 16, wherein after sending a first read command to read out one or more page data in the memory cells of the memory cell array, and sending a second read command to read out first page data in a first data latch and the last page data in a second data latch, wherein the memory controller is further configured to:
redistribute new physical addresses of corresponding memory cells of the memory cell array to the last page data of the page buffer, and
program the last page data into the memory cell array with the new physical addresses.

* * * * *